Sept. 29, 1936.   A. L. WARNER   2,056,029
MOWER GUARD AND PLATE SECURING MEANS THEREFOR
Filed Aug. 10, 1935   3 Sheets-Sheet 1
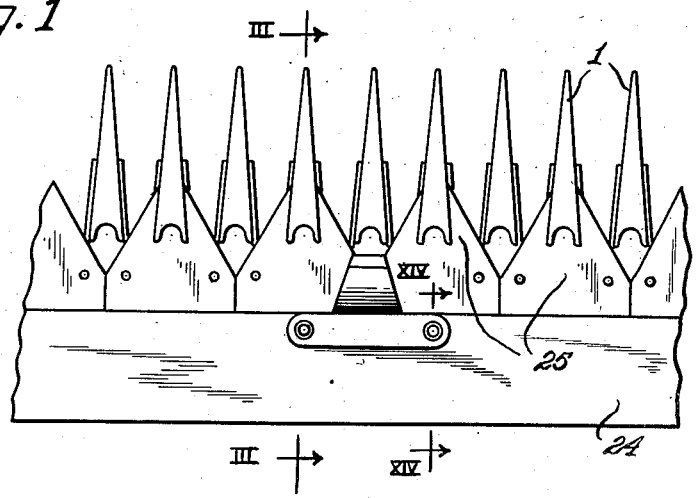
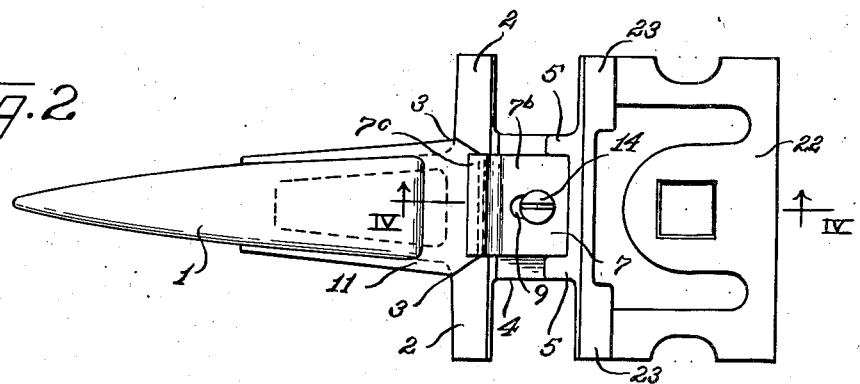
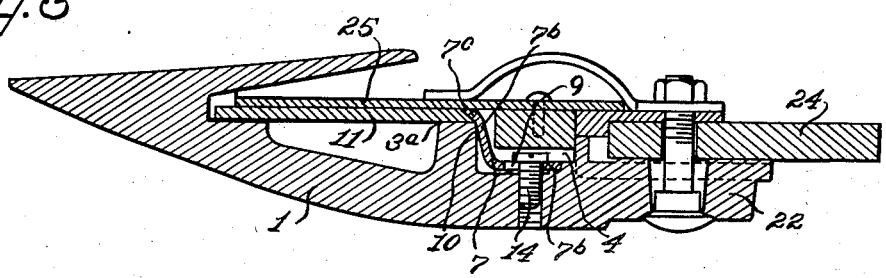
Inventor
Arthur L. Warner
by Charles A. Hills Attys Sept. 29, 1936.  A. L. WARNER  2,056,029
MOWER GUARD AND PLATE SECURING MEANS THEREFOR
Filed Aug. 10, 1935  3 Sheets-Sheet 2
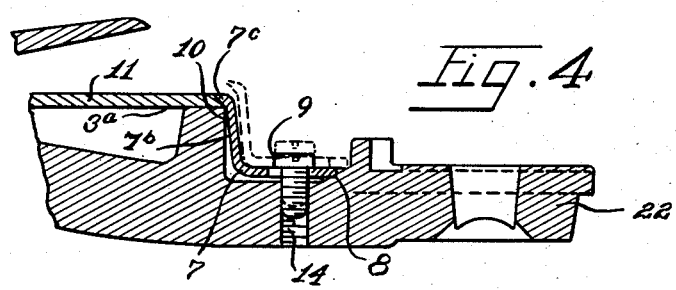
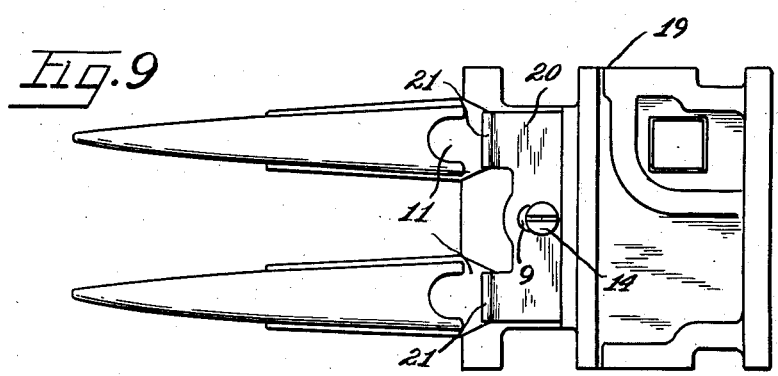
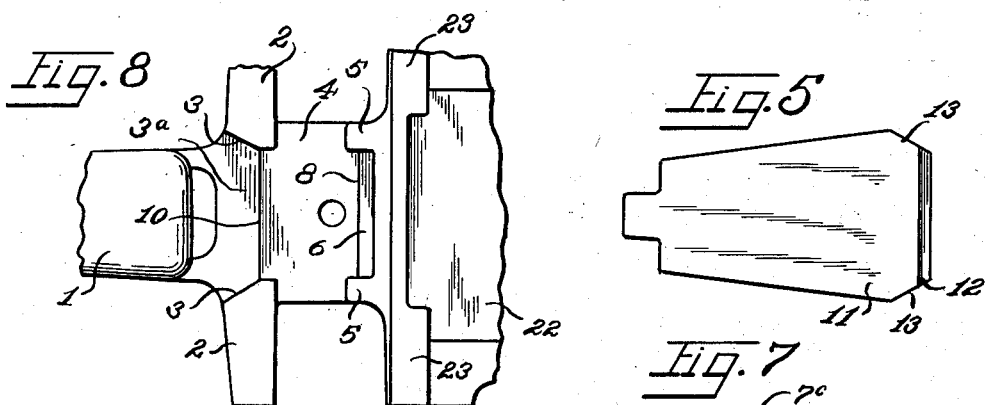
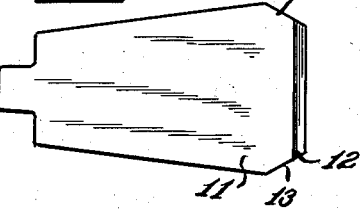
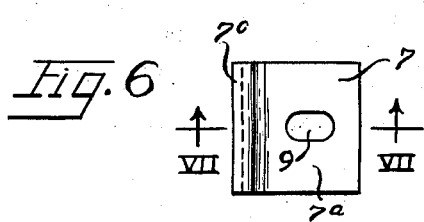
Inventor
Arthur L. Warner
by Charles O. Hills Attys Sept. 29, 1936.   A. L. WARNER   2,056,029
MOWER GUARD AND PLATE SECURING MEANS THEREFOR
Filed Aug. 10, 1935   3 Sheets-Sheet 3
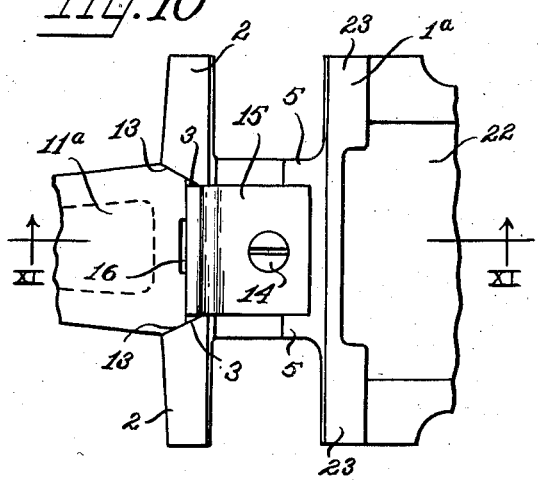
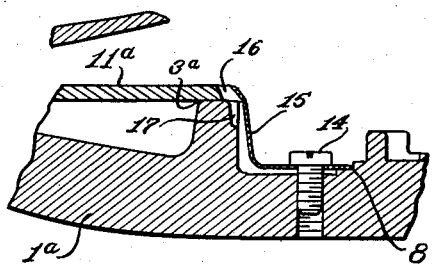
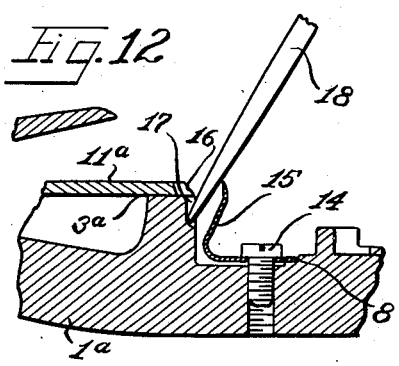
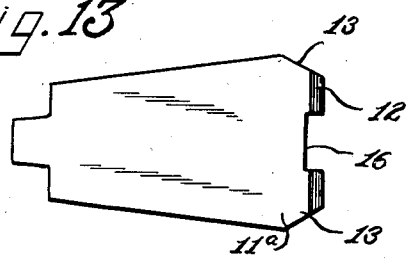
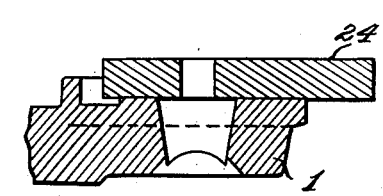
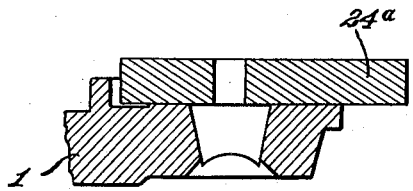
Inventor
Arthur L. Warner Patented Sept. 29, 1936

2,056,029

UNITED STATES PATENT OFFICE 2,056,029

MOWER GUARD AND PLATE SECURING MEANS THEREFOR

Arthur L. Warner, Elgin, Ill., assignor to Illinois Iron & Bolt Company, Carpentersville, Ill., a corporation of Illinois Application August 10, 1935, Serial No. 35,568

5 Claims. (Cl. 56—311)

This invention relates to a mower guard and a plate securing means therefor.

It has been customary in the past in constructing mower guards to provide the same with ledger plates. In standard constructions each ledger plate was generally provided with a centering notch and a bolt or rivet aperture through which the securing rivet extended. To remove such a ledger plate, it was necessary to remove the rivet and this frequently proved to be a tedious operation. In addition, a centering lug was usually provided on the guard that would fit the centering notch in the ledger plate.

This invention is designed to overcome the above noted objections in the provision of a ledger plate that requires no securing aperture or centering notch and that can be readily centered and releasably maintained in a novel manner.

The ledger plate may be designed to receive different securing means and the guards may be constructed so that the same may be adapted for different mowers.

According to this invention, a ledger plate can be readily applied or removed by a slight shifting movement of the securing means. Likewise the attaching portion of the guards may be readily machined away to fit a different machine.

The invention comprises the novel structure and combination of parts hereinafter described and more particularly pointed out and defined in the appended claims.

In the accompanying drawings which illustrate certain preferred embodiments of this invention and in which similar reference numerals refer to similar features in the different views:

Figure 1 is a fragmentary top plan view of a mower guard construction involving this invention.

Figure 2 is a top plan view of a mower guard illustrating a ledger plate and attaching means involving this invention.

Figure 3 is an enlarged sectional view taken upon the line III—III of Figure 1 looking in the direction of the arrows.

Figure 4 is a fragmentary sectional view taken upon the line IV—IV of Figure 2 looking in the direction of the arrows and illustrating in dotted lines the manner of removing a ledger plate.

Figure 5 is a plan view of the ledger plate.

Figure 6 is a top plan view of the attaching means for the ledger plate.

Figure 7 is a sectional view taken upon the line VII—VII of Figure 6 looking in the direction of the arrows.

Figure 8 is a fragmentary top plan view of a mower guard modified according to this invention.

Figure 9 is a plan view of a twin guard illustrating the application of this invention.

Figure 10 is an enlarged fragmentary top plan view of a mower guard equipped with a modified form of this invention.

Figure 11 is an enlarged sectional view taken substantially upon the line XI—XI of Figure 10 looking in the direction of the arrows.

Figure 12 is a view similar to Figure 11 illustrating the manner of removing a ledger plate.

Figure 13 is a plan view of the ledger plate involving the modified form of the invention.

Figure 14 is an enlarged fragmentary sectional view taken substantially upon the line XIV—XIV of Figure 1 looking in the direction of the arrows.

Figure 15 is a view similar to Figure 14 illustrating the adaptation of the guards to a different mower.

The embodiment of the invention disclosed in Figures 1 to 8 will first be described, and in referring to these figures, it will be observed that Figure 1 illustrates a fragmentary portion of a cutter bar construction for a mower and that Figures 2, 3, and 4 illustrate a mower guard dissociated from the structure shown in Figure 1 for illustrating this embodiment of the invention more clearly. In accordance with this embodiment of the invention, each mower guard 1 has its side arms or wings 2 provided with sloping or diverging shoulders 3 adjacent the supporting surface 3a for the usual ledger plates as shown more clearly in Figure 8 and the lower portion 4 thereof just rearwardly of said wings is formed with a pair of spaced forwardly extending lugs 5 that form a centering recess 6 therebetween for the rear end of the attaching plate 7. A right angle 8 is milled or formed in the recess 6 coextensive therewith for receiving the rear edge of the attaching plate 7 as shown in Figure 4.

The attaching plate 7 is formed with a lower attaching portion 7a provided with a screw slot 9. The rear edge of this lower portion is adapted to extend and fit in the recess 6 between the lugs 5. The lower portion 7a of said attaching plates 7 merges into a substantially upright portion 7b that slightly slopes forwardly as shown. A suitable recess 10 is formed in the guard between the side wings 2 to receive the upright portion 7b of the attaching plate as shown more clearly in Figure 8. The upper end of this upright portion 7b terminates in a forwardly extending flange or lip 7c that is beveled upon its underside as indicated at 7d (Figure 7).

The ledger plate 11 as shown in Figure 5 is provided with a rear beveled edge 12 over which the lip or flange 7c is clamped and it is also provided with rear sloping or beveled corners 13 corresponding to the sloping shoulders 3 on the side wings. It will be evident that when the ledger plate is placed in position in its guard, the beveled shoulders 3 with which the beveled corners 13 coact will properly center the ledger plate, and that the coacting beveled surfaces 7c and 12 bring the upper surfaces thereof substantially flush. However instead of beveling these coacting surfaces, they may be otherwise reduced to bring the upper surfaces substantially flush.

In Figures 2 to 4 it will be observed that the attaching plate 7 is firmly clamped upon the rear sloping edge of the ledger plate 11 by means of a screw 14 extending through the slot 9 thereof. To remove a ledger plate, it is only necessary to sufficiently loosen the screw 14 so that the plate 7 can be elevated above the shoulder formed by the right angle 8 and can be shifted rearwardly as shown in dotted lines in Figure 4. This elevation and rearward shifting of the plate 7 will disengage and release the ledger plate 11. It will be obvious that the slot 9 allows the plate 7 to be shifted forwardly relatively to the screw 14 to tightly embrace the ledger plate before the screw is tightened when a new ledger plate is applied. The parts are preferably so designed that the rear edge of the attaching plate 7 abuts the shoulder of the angle 8 when the said attaching plate 7 tightly embraces the ledger plate 11 so that the parts are rigidly retained.

Instead of using a shiftable attaching plate for the ledger plate as illustrated in Figures 1 to 8, a stationary resilient or flexible attaching plate 15 may be used as shown in Figures 10 to 12. The attaching plate 15 as shown is substantially like the plate 7 but instead of a screw slot, it is merely provided with an aperture for receiving the attaching screw 14. The plate 15 should however be resilient while the plate 7 need not be resilient. In this modified form of the invention, the ledger plate which is represented by the reference 11a is similar to the ledger plate 11 in that it has the beveled corners 13 and the rear beveled edge 12. The plate 11a however differs from the ledger plate 11 in that it has a recess 16 in its rear edge for receiving a tool as will later more fully appear.

In this modified form of the invention the guards 1a are similar to the guards 1 shown in Figures 1 to 8 with the exception that a tool recess 17 is provided in the wall between the side wings 2. This recess 17 is in alinement with the recess 16 as shown in Figures 11 and 12. In Figures 10 and 11, the clamping plate 15 is shown in operative position engaging over the rear beveled edge 12 of the ledger plate 11a. When it is desired to remove a ledger plate for some reason, it is only necessary to insert a tool such as the tool 18 shown in Figure 12 in the recesses 16 and 17 and swing the same rearwardly for flexing the plate 15 from engagement with the ledger plate 11a as shown in Figure 12. During this operation, the lower end of the tool will be fulcrumed in the recess 17 and as the tool is swung rearwardly it will act as a lever of the second class. Due to the fact that the attaching plate 15 abuts a shoulder formed by the right angle 8, the horizontal portion is firmly held in position when flexed rearwardly. After a new ledger plate 11a has been placed in position, the tool 18 is removed to allow the vertical portion of the plate 15 to spring back into position.

In the event that twin guards 19 are used as shown in Figure 9, an attaching plate 20 having a screw slot 9 for receiving a screw 14 may be used. This attaching plate 20 should be provided with two spaced vertical portions 21 formed similar to the upstanding portion of the plate 7 for engaging the beveled edges of the ledger plates 11 in the twin guards. The ledger plates 11 in the twin guards may be removed and replaced as set forth in connection with the first embodiment of this invention and a further description thereof appears unnecessary.

In the present embodiment of this invention, the guards are provided with attaching portions 22 having elevated abutments 23 as shown in Figures 2 and 8 for abutting relation with a plate 24 to which the guards are attached. In Figure 14 there is shown the normal relation of parts. These abutments are made sufficiently wide so that they can be ground away to accommodate a different structure 24a as shown in Figure 15. The construction of the guards may therefore be readily varied to suit different structures.

It will be appreciated from the foregoing that the ledger plates are properly centered by the sloping walls 3 adjacent the sides of the supporting surface 3a, and that the clamping plates therefor are firmly maintained against lateral movement by the side walls of the recess 10 and the lugs 5. It is however possible to move the engaging portion of each clamping plate rearwardly to disengage its ledger plate for the purpose of removing and replacing a ledger plate without any appreciable loss of time and effort as previously set forth. The cutting sections 25 which are reciprocated over the ledger plates must of course be removed before a ledger plate can be removed or replaced.

With the foregoing construction in use, it becomes an easy problem to renew the ledger plate or remove the same for grinding or the like as no riveting will be required. Nevertheless the ledger plates will be firmly and securely maintained in position during usage.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a mower guard having a supporting surface, a ledger plate having a rear beveled end seated upon said supporting surface, an angular clamp having a vertical portion with a beveled lip engaging the beveled edge of said ledger plate and being flush therewith, said guard having a depressed seat with parallel side lugs and said clamp having a horizontal portion positioned in said seat between said lugs, and a screw extending through the horizontal portion of said clamp for securing the clamp in position, and adapted to be loosened for elevating said clamp and releasing said ledger plate.

2. In a mower guard, a ledger plate having a rear beveled end, an angular clamp having a vertical portion with a beveled lip engaging the beveled end of said ledger plate in flush relation therewith, said clamp having a horizontal portion provided with a slot, said guard having a recess for receiving said horizontal portion and a shoulder rearwardly of said recess and an anchor screw extending through said slot for retaining said clamp in position, said screw being adapted to be loosened, to allow said clamp to be elevated and shifted rearwardly for engaging upon said shoulder.

3. In a mower guard having side wings with a recess between said wings, a ledger plate supported upon said guard and having a rear beveled end adjacent said recess, an angular clamp having a vertical portion seated in said recess and provided with a beveled edge engaging the beveled edge of said ledger plate in flush relation therewith, said clamp having a horizontal attaching portion and means including a screw associated with said guard for anchoring said horizontal portion and centering the same, said screw being adapted to be loosened for allowing said clamp to be elevated.

4. A mower guard having side wings with a recess therebetween and having a lower portion provided with spaced lugs defining a recess in alignment with the first mentioned recess but in angular relation thereto, a ledger plate having a rear beveled end seated upon said guard, and a clamp having angular portions seated in said recesses, said clamp having an upper beveled end for engaging the beveled end of said ledger plate, and a screw for securing said clamp in position and adapted to be partially unscrewed to allow said clamp to be elevated.

5. In a mower guard having a ledger plate supporting surface, a ledger plate upon said surface and having a rear beveled end, an angular clamp having a vertical arm provided with a beveled lip for engaging the beveled end of said ledger plate, said guard having a recess for receiving the vertical arm of said clamp for confining the same against lateral movement, said guard having also a horizontal recess, said clamp having a horizontal base portion seated in said recess, said base portion having a slot, and an attaching screw extending through said slot for anchoring said clamp to said guard.

ARTHUR L. WARNER.